(No Model.)
C. F. TAYLOR.
METHOD OF AND APPARATUS FOR TREATING RAGS FOR PAPER STOCK.
No. 287,482. Patented Oct. 30, 1883.
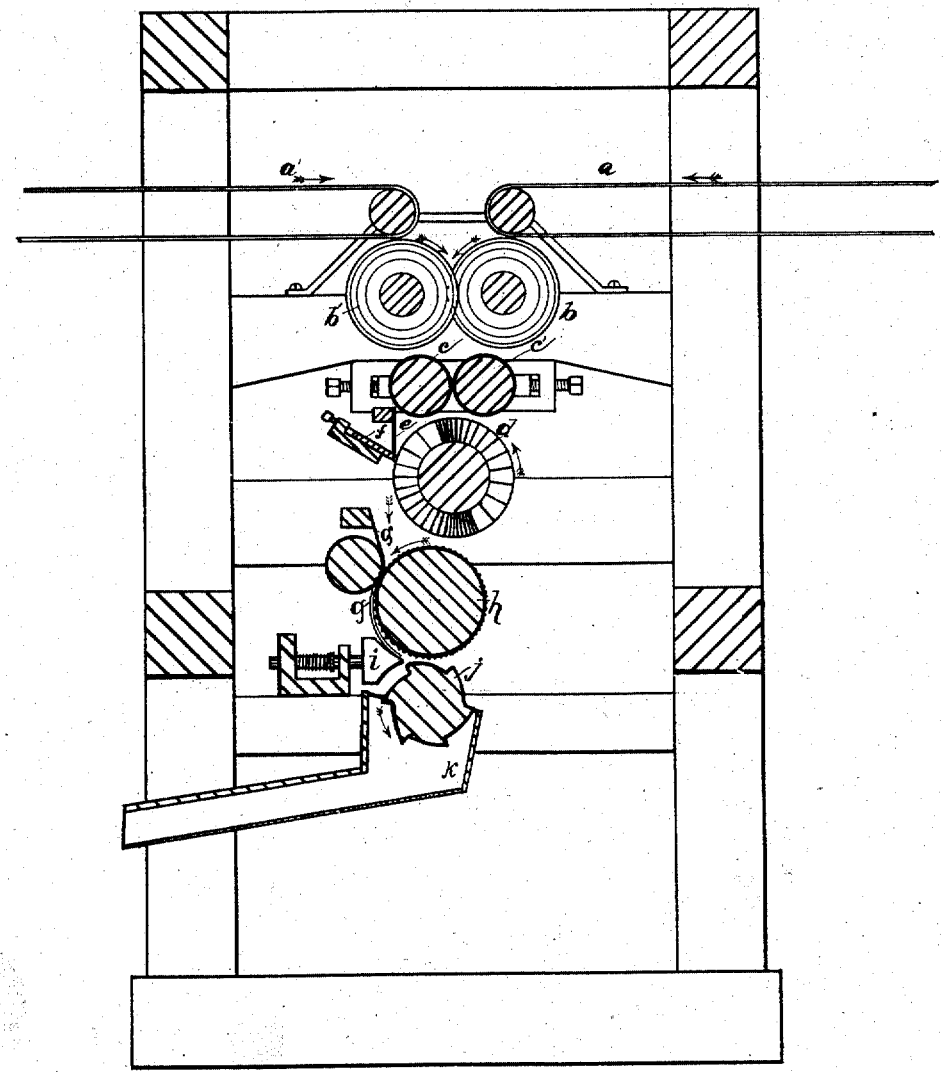
WITNESSES
C. A. Haynes
L. P. Bunker
INVENTOR
Charles F. Taylor
By Allen Webster
Attorney

United States Patent Office.

CHARLES F. TAYLOR, OF SPRINGFIELD, MASSACHUSETTS.

METHOD OF AND APPARATUS FOR TREATING RAGS FOR PAPER-STOCK.

SPECIFICATION forming part of Letters Patent No. 287,482, dated October 30, 1883.

Application filed March 29, 1883. (No model.)

*To all whom it may concern:*

Be it known that I, CHARLES F. TAYLOR, of Springfield, in the county of Hampden and State of Massachusetts, have invented new and useful Improvements in Method of and Apparatus for Treating Rags for Paper-Stock, of which the following is a specification, reference being had to the accompanying drawings.

This invention relates to improvements in the construction of machines for treating rags for paper-stock, and more particularly to improvements in the construction of machines for carrying out the processes set out in prior or other applications for patents filed, or to be filed, by me.

The object of this invention is to improve the construction of rag cutting and dressing machines, and I accomplish these objects by the construction herein shown.

My invention therefore consists in the construction and arrangement whereby the objects of my invention are attained.

In the accompanying drawing, in which similar letters of reference indicate like parts, a side view of a machine in section is shown embodying my invention.

The present state of the art of dressing and cutting rags for paper-stock is too well known by those skilled in the art to require description, and the same has been largely set out in the applications heretofore filed by me.

The construction of the machine will be readily understood on referring to the drawing.

The material to be treated is placed upon the aprons $a$, by which it is carried to the gang of circular cutting disks or knives $b$, which separate the rags into strips which, falling, pass between the pressure-rolls $c$ $c'$. These rolls have bearings in a frame, which permit the rolls to separate and allow rags of varying thickness to pass, while a pressure is maintained which is sufficient to crush such foreign matter as will crumble under pressure and cause other matter to cut itself free, thus loosening the foreign matter from the cloth in its passage from the stripping device to the cross-cutting device. These rolls may serve the double purpose of pressure-rolls and feed-rolls, as they grip and hold the material as it passes to the cross-cutting device. The strips ing blade $d$, which, moving in the direction indicated by the arrow, carries the strips between the cutting-edge of the moving blade and the edge of the fixed blade or piece $f$. After being thus cut the material falls to the feed-roll $h$, which, revolving, as indicated, carries the material between its surface and the springs $g$ to the beater-bar $i$, where it is operated upon by the beater $j$ and subjected to a series of blows, which operate to crush and beat out any foreign matter that may be found attached to the material. From the beater the material falls to the sieve $k$, which has a rapid vibratory motion, and the dust and foreign matter fall through the meshes.

The advantage of this construction over other rag-cutting machines which both strip and cross-cut is found in the arrangement whereby all aprons, carrying or feeding devices, after being first fed to the machine, are dispensed with. This, it will be seen, results largely from the relative location of the parts, whereby the material falls from one device to the other.

It will be seen that the result will be the same if the horizontal cutting device be placed ahead of the rotary disks, the first cutting device operating to strip and the second to cross-cut.

This shape, construction, and arrangement of the parts may be greatly varied without departing from my invention.

By neglecting to claim all features shown in this application I do not intend thereby to abandon the same; but it is my intention to make these features the subject-matter of a separate application.

Having therefore described my invention, what I claim, and desire to secure by Letters Patent, is—

1. In a rag-cutting machine, two cutting devices adapted to cut the rags in opposite directions, and located one above the other, whereby the material will be fed from the stripping to the cross-cutting device without intermediate interference.

2. In a rag-dressing machine, the cutters $b$, located above the cutting device $d\,f$, substantially as shown.

3. In a rag-cutting machine, the combination of the rotary cutters $b$, rolls $c$, cutters $d\,f$, are separated into short pieces by the revolving, and a means to feed the material to the cutters $b$, all constructed and operating substantially as shown.

4. A rag-dressing machine having a means to subject the material to pressure in its passage from the stripping device to the cross-cutting device, whereby foreign matter is loosened, substantially as shown.

5. The combination of the cutters $b\ b'$, rolls $c\ c'$, provided with a means to force them together, and the cutters $d\ f$, constructed and operating substantially as shown.

6. In a rag-dressing machine, the combination of a stripping device, a cross-cutting device, and a cleaning device arranged one above the other, substantially as and for the purposes stated.

CHAS. F. TAYLOR.

Witnesses:
 ALLEN WEBSTER,
 CHAS. P. HOOKER.

Correction in Letters Patent No. 287,482.

It is hereby certified that in Letters Patent No. 287,482, granted October 30, 1883, upon the application of Charles F. Taylor, of Springfield, Massachusetts, for an improvement in the "Method of and Apparatus for Treating Rags for Paper-Stock," an error appears requiring correction, as follows: line 1, page 2 of the printed specification, consisting of the words "are separated into short pieces by the revolv-," should have been omitted therefrom and inserted at the head of column 2, page 1; and that the patent should be read with this correction therein to make it conform to the record of the case in the Patent Office.

Signed, countersigned, and sealed this 13th day of November, A. D. 1883.

[SEAL.]

M. L. JOSLYN,
*Acting Secretary of the Interior.*

Countersigned:
    BENJ. BUTTERWORTH,
        *Commissioner of Patents.*